Patented June 10, 1930

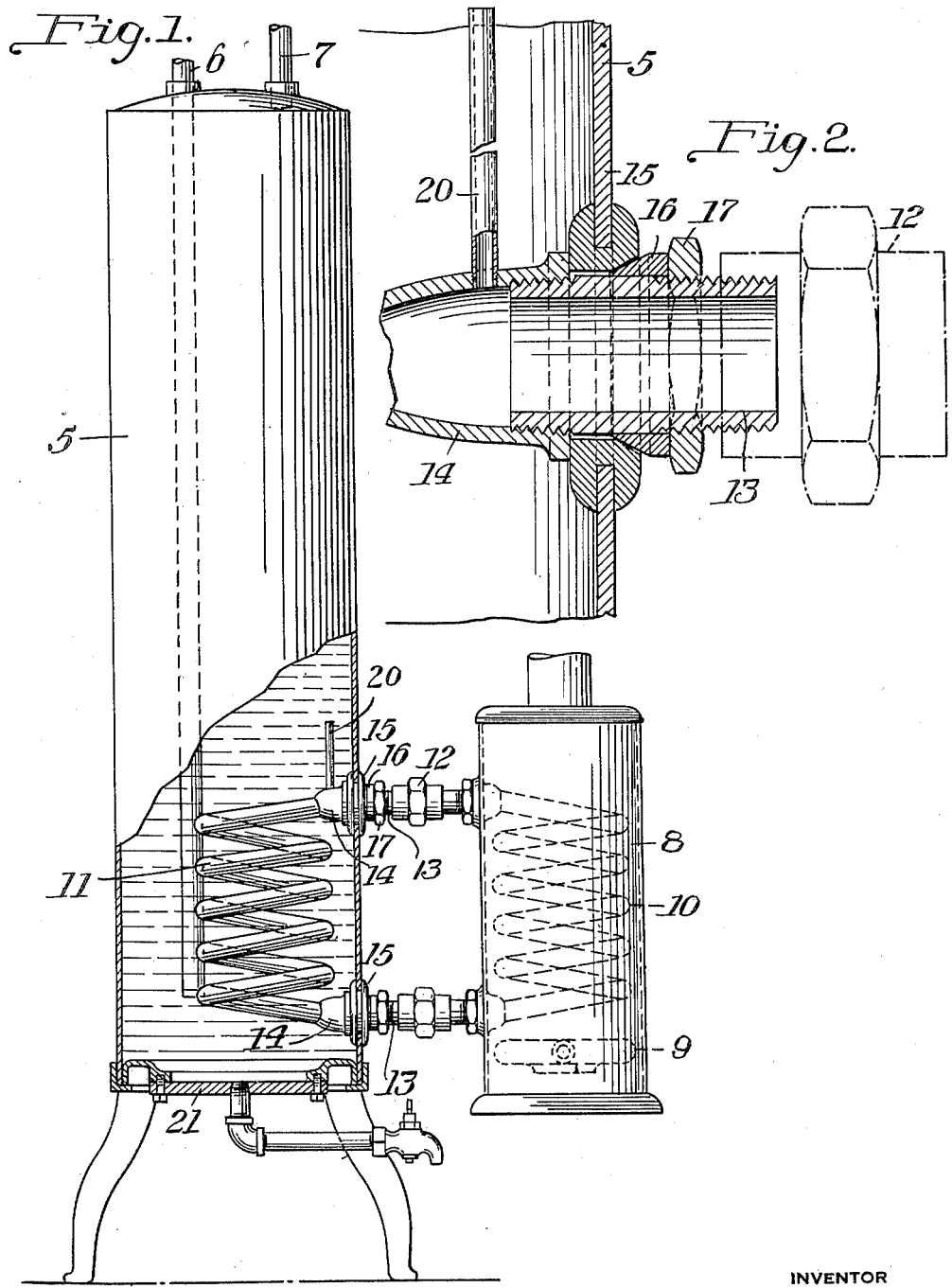

1,762,522

UNITED STATES PATENT OFFICE

ROBERT E. NEWELL, OF IRWIN, PENNSYLVANIA

WATER HEATER

Application filed November 6, 1926. Serial No. 146,661.

My invention relates to water heaters, and more particularly to those suitable for heating water for domestic uses, although it will be understood that the invention may be employed in various other types of systems.

One form of water heater heretofore employed comprises a storage tank into which the upper and lower ends of a heating coil are tapped, a burner being placed under the heating coil. Water from the tank passes into the lower end of the coil and is caused to flow upwardly therethrough and back into the tank, by reason of the action of the heat. This arrangement is objectionable, particularly where hard water is employed, by reason of the fact that lime or other scale deposits accumulate upon the interior of the coil to such an extent as to interfere with the circulation of the water and to reduce the efficiency of the heater because of the heat insulating effect produced by the scale. Furthermore, the coil may become clogged and result in explosions.

Another type of heater comprises a system wherein circulating coils are brought into contact with a burner flame and with a body of water to be heated, the water within the coils not commingling with the body of water to be heated, but in many of these heaters suitable provision has not been made for expansion and contraction, nor for balancing of pressure as between the two bodies of water.

In the latter type of heater, that portion of the coil or system that lies within and transfers heat to the main body of water, becomes encrusted on its exterior surface, by reason of mineral deposits from the main body of water, with the result that there is a less effective transfer of heat, and the water within the coils may become too highly heated, and an excessive quantity of steam thereby developed therein.

One object of my invention is to provide a heating apparatus of simple form, wherein various of the above named objections are eliminated.

Another object of my invention is to provide an indirect water-heating system wherein there is balanced pressures and the water in the circulating coils is prevented from commingling with the body of water being heated.

Another object of my invention is to provide a simple and effective arrangement whereby water in the circulating coils will be automatically maintained at predetermined volume.

Still another object of my invention is to provide an arrangement of circulating coils—one within a hot water tank, and one connected to the first named coil and positioned over a burner—that are interchangeable so that an exteriorly encrusted coil from the interior of the heater may be transferred to a position above the burner, to permit the scale to be burned away.

A further object of my invention is to simplify and improve the structural details of water-heating systems.

Some of the forms which my invention may take are shown in the accompanying drawing, wherein Figure 1 is an elevational view, partially in section, of a heating system embodying one form of my invention, and Fig. 2 is a sectional view, on an enlarged scale, of a portion of the apparatus of Fig. 1.

Referring now to Figs. 1 and 2, I show a hot-water storage tank 5, that is provided with the usual cold-water inlet 6, and a hot-water outlet 7. A heater casing 8 comprises a gas burner 9 and a heat-receiving coil 10 that communicates, through connections to be hereinafter described, with a heat transfer coil 11. These two coils serve as a heat circulating system.

The upper end of the coil 11 is connected through a pipe union 12 to a nipple 13. The inner end of the nipple 13 has screw-threaded connection with the flared upper end portion 14 of the coil 11. The tank 5 is provided with an opening for the nipple 13, and a metallic gasket or spud 15 has its edges reamed over to snugly engage the walls of the tank. A packing ring or gasket 16 of brass, or other suitable material that is preferably softer than the gasket 15, is bevelled at its forward edge, and is forced inward into snug engagement with the spud 15 and the exterior wall of the nipple 13, by a nut 17, so as to make a water-tight joint. The lower end of the coil 10 is connected to the lower end of the coil 11, and to the wall of the tank 5, in substantially the same manner as shown in Fig. 2.

Not only is the supply of water in the coils 10 and 11 automatically maintained through the communicating conduit 20, but such conduit insures a balancing of pressures as between the water within the tank 5 and that within the coils, so that in case of a leak in the coil 11, or its connections which lie within the tank 5, the sediment-containing water within the coils will not be intermingled with the main body of water. The pipe 20 is preferably extended upward for some distance, and the water contained therein will therefore be of substantially the same temperature as the main body of water, so that any tendency of the heated water within the coils to pass from the upper end of the coil 11 into the body of water will be overcome. Since the displacement within the pipe 20, by reason of expansion and contraction is small, there will ordinarily be no flow of water from the coil to the main body of water nor no interchange of water in the reverse direction.

In assembling the apparatus, the coil 11 may be conveniently inserted through a hand hole opening in the bottom of the tank 5, that has a cover 21, and is then connected up to the other parts of the system as shown in Fig. 2. This arrangement also permits the convenient removal of the coil 11 in case it becomes encrusted by deposits from the main body of water. The positions of the coils 10 and 11 can therefore be reversed so that the coil 11 will be above the burner 9 and the exterior deposits thereby burned away. Scale deposits within the coils 10 and 11 will be slight over a considerable period of time because a given volume of water is circulated therethrough many times, being slightly replenished only occasionally, and such volume of water can contain only a small amount of scale-forming material.

By locating the coil 11 near the bottom of the boiler, there is less tendency for scale to accumulate thereon, because the lower portion of the body of water is cooler than that in the upper part of the tank.

I claim as my invention:

In water heater structure, the combination with a storage tank and a combustion chamber, of a circulating system comprising a conduit including heat-transfer and heat-receiving sections disposed within said tank and combustion chamber, respectively, the said sections being detachably connected together, and of such form as to pemit the interchange thereof.

In testimony whereof I, the said ROBERT E. NEWELL, have hereunto set my hand.

ROBERT E. NEWELL.